Aug. 1, 1961
S. S. BROWN
2,994,224
FLUID SAMPLER
Filed Sept. 15, 1958
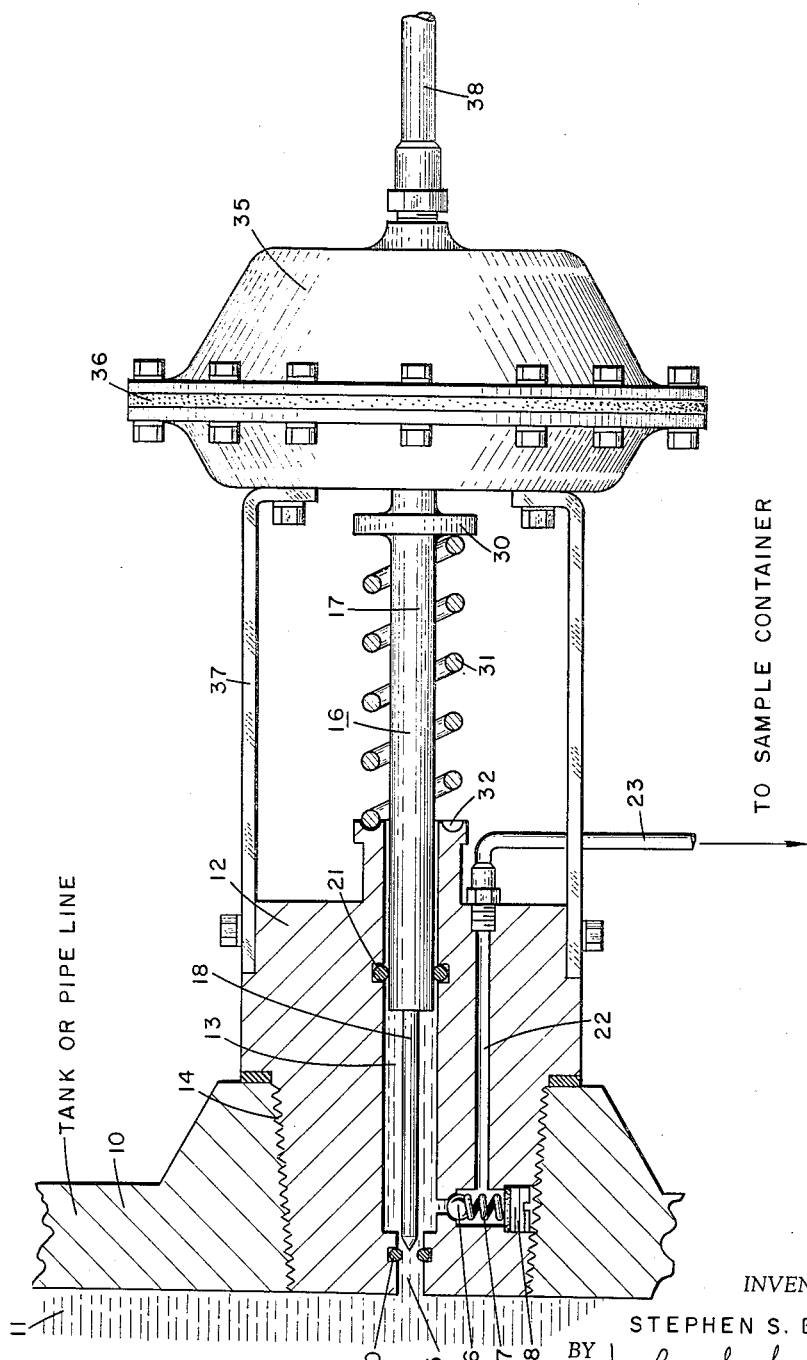
INVENTOR.
STEPHEN S. BROWN,
BY
ATTORNEY.

United States Patent Office 2,994,224
Patented Aug. 1, 1961

2,994,224
FLUID SAMPLER
Stephen S. Brown, La Porte, Tex., assignor, by mesne assignments, to Jersey Production Research Company, Tulsa, Okla., a corporation of Delaware
Filed Sept. 15, 1958, Ser. No. 760,969
1 Claim. (Cl. 73—422)

This invention concerns fluid samplers and more particularly it concerns a device for taking samples of fluid flowing in a pipe or retained in a vessel.

Briefly, the invention comprises a body member provided with a chamber; movable means arranged in the chamber; the chamber fluidly communicating with a receptacle containing the fluid being sampled when the movable means is in one position; a conduit fluidly communicating the chamber and the exterior of the body member; a check valve arranged in the conduit adapted to permit flow of fluids from the chamber and to prevent flow of fluids to the chamber; sealing means arranged on the body member adapted to sealingly engage said movable means when the movable means moves from said one position to another position whereby a fluid sample is first isolated in said chamber and then forced through said conduit; and means for moving said movable means. Preferably, movement of the movable means in one direction is effected by a fluid signal actuated diaphragm and movement of the movable means in an opposite direction is effected by a biasing means.

The apparatus of the invention provides advantages over known fluid samplers. For example, one advantageous feature of the invention is the elimination of a check valve in the inlet to the sampler. Location of a check valve in a sampler inlet is disadvantageous because the check valve is subjected to wear and leakage; further, the check valve is inaccessible without removing the entire sampler from the pipe or vessel in which it is installed. The device of the invention utilizes a check valve on the discharge conduit of the sampler where the check valve may be mounted externally so that it may be readily accessible. Another advantageous feature of the invention is the slide action of the movable means through the full length of the sample chamber which makes the sampler essentially self-cleaning.

Thus, an object of this invention is to obtain samples of fluid flowing in a conduit or retained in a vessel without affecting the pressure of the system, the flow of the fluids, or risk of contamination, or escape of the fluid.

This and other objects of the invention will be apparent from a description of the invention taken in conjunction with the drawings wherein:

The sole FIGURE is a vertical view partly in section showing the fluid sampler of the invention in sample-taking position.

In the figure is shown a tank or pipe line 10 containing fluid indicated at 11. A body member 12, provided with a chamber 13 is screw-threadedly connected as at 14 to tank 10. Chamber 13 includes a narrowed portion 15 which fluidly communicates with the interior of tank 10.

A plunger 16 provided with a piston portion 17 and a rod portion 18 extends into chamber 13. Rod portion 18 is of lesser diameter (or cross-sectional area) than the diameter of chamber 13 and piston portion 17 has approximately the same diameter as chamber 13.

Sealing means 20 is arranged on body member 12 in the narrowed portion 15 of chamber 13. Also, sealing means 21 is arranged on body member 12 in chamber 13.

Sealing means 20 and 21 may be suitably O-rings which are adapted, respectively, to seal off about rod 18 when plunger 16 moves toward the interior of tank 10 and about piston portion 17 at all times.

A conduit 22 is formed in body member 12 and extends from the lower end of chamber 13 to the exterior of body member 12 where conduit 22 fluidly communicates with a pipe or other conduit 23 connected to body member 12. Conduit 23 feeds to a sample container, not shown. A check valve is arranged in conduit 22 and is adapted to permit flow of fluid from chamber 13 to conduit 23 when movement of plunger 16 builds up pressure in chamber 13 and to prevent flow of fluid from conduit 23 into chamber 13. It comprises a ball 26 biased by a spring 27. Access to the ball and spring members is provided by means of a threaded plug 28.

Piston portion 17 of plunger 16 is provided with a collar or shoulder 30 which provides a stop for one end of a spring biasing member 31. Body member 12 is provided with a groove 32 which is adapted to retain the other end of spring biasing member 31.

A diaphragm housing 35 provided with a diaphragm 36 is supportingly mounted on body member 12 by means of struts 37. One end of piston portion 17 of plunger 16 connects to diaphragm 36. A conduit 38 is connected to housing 35 and fluidly communicates the interior thereof with a fluid pressure source, not shown.

In operation, when it is desired to take a sample of fluid contained in tank 10, fluid pressure is exhausted from diaphragm 36 through conduit 38 and spring 31 urges plunger 16 to the position shown in the figure. In this position fluid from tank 10 enters chamber 13 through the narrow portion 15 thereof. Check valve 26 prevents fluid from discharging from chamber 13 through conduits 22 and 23. When a sample of fluid has collected in chamber 13, a fluid pressure signal is transmitted through conduit 38 to diaphragm 36 which, in turn, moves plunger 16 against the bias of spring 31. Initial movement of plunger 16 seals off fluid in chamber 13 between sealing means 20 and 21. Continued movement of plunger 16 moves rod portion 18 further through sealing means 20 and causes piston portion 17 to build up pressure on the fluid trapped in sample chamber 13. This causes check valve 26 to open and the fluid sample to be forced out of chamber 13 through sample outlet conduits 22 and 23 to a sample container. Plunger 16 may remain in this position until the fluid pressure signal in conduit 38 is removed from diaphragm 36. Upon this occurrence, spring 31 acting on collar or shoulder 30 returns plunger 16 to the open position and the empty sample chamber 13 is ready to receive another sample.

The sampler is especially adaptable for use with an automatically operated dump type meter. For example, when the meter 10 is filling, plunger 16 is withdrawn from sealing means 20, as shown in the figure. As the metering tank fills, the sample chamber 13 also fills with the fluid in the tank. When the vessel becomes full and the fluid pressure signal closes the inlet to the vessel, it also may apply pressure through conduit 38 to diaphragm 36. This moves rod portion 18 of plunger 16 into sealing position with sealing means 20. Thus, the contents of the sample chamber is entrapped and isolated from the metering tank.

Having fully described the apparatus, objects and operation of my invention, I claim:

Apparatus for sampling fluids in a receptacle comprising a body member provided with a chamber, one end of which is adapted to fluidly communicate with said receptacle; a movable unitary plunger arranged to reciprocate in said chamber from a first to a second position and vice-versa, one end of said plunger being larger, in cross-section than the other end thereof; first sealing means arranged adjacent one end of said chamber sealingly engaging said one end of said plunger to seal off the space therebetween; second sealing means arranged adjacent said other end of said chamber sealingly engaging said other end of said plunger to seal off the space therebetween when said plunger is in said second position and unsealing with said other end of said plunger to permit fluid communication between said chamber and said receptacle when said plunger is in said first position; a conduit arranged in said body member and fluidly communicating said chamber between said first and second sealing means and the exterior of said body member; a check valve arranged in said conduit adapted to permit flow from said chamber and to prevent flow to said chamber through said conduit; and means for moving said plunger from said first to said second position and vice-versa including a source of fluid pressure, a diaphragm connected to said plunger and actuated by said fluid pressure, and biasing means mounted on said body member and connected to said plunger adapted to urge said plunger to said first position whereby when said plunger is in said first position fluid from said receptacle enters said chamber and initial movement of said plunger from said first to said second position isolates fluid in said chamber and continued movement of said plunger to said second position forces fluid isolated in said chamber through said conduit and check valve.

References Cited in the file of this patent

UNITED STATES PATENTS

| | | |
|---|---|---|
| 1,837,858 | Grace | Dec. 22, 1931 |
| 2,205,875 | Coffey et al. | June 25, 1940 |
| 2,794,344 | Boren | June 4, 1957 |
| 2,836,978 | Warren | June 3, 1958 |